April 19, 1949.   L. NEWCOMB   2,467,685
AIR THROTTLE CONTROL FOR INTERNAL-COMBUSTION ENGINES
Filed Oct. 5, 1945
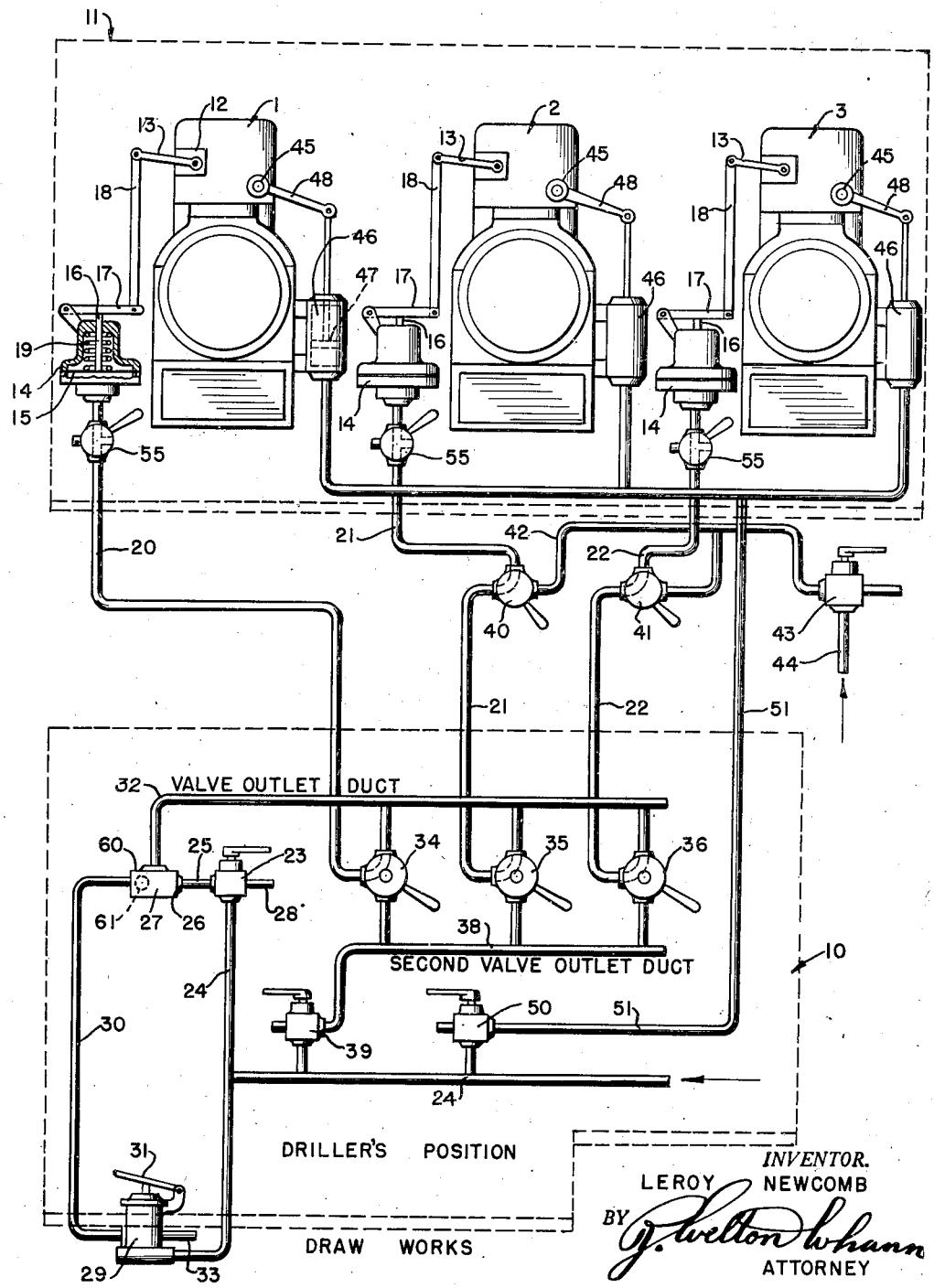
INVENTOR.
LEROY NEWCOMB
BY
ATTORNEY Patented Apr. 19, 1949

2,467,685

UNITED STATES PATENT OFFICE 2,467,685

AIR THROTTLE CONTROL FOR INTERNAL-COMBUSTION ENGINES

Leroy Newcomb, San Gabriel, Calif., assignor to Emsco Derrick & Equipment Company, Los Angeles, Calif., a corporation of California Application October 5, 1945, Serial No. 620,483

10 Claims. (Cl. 60—97)

My invention relates to well drilling machinery, and relates in particular to means for the simplification of the control of the internal combustion engines now used in drilling and other operations connected with the drilling of wells.

It is an object of the invention to provide a remote control operable by the driller from his position in the derrick to control the operation of internal combustion engines situated outside the derrick.

In the drilling of deep wells heavy equipment is required. In some instances the source of power required for the operation of this equipment consists of three or more internal combustion engines, such as Diesels or other engines employing hydrocarbon fuel. In conjunction with these engines there is an adjustable power transmission employing clutches, torque compensators, etc., whereby all of the engines may be hooked up in tandem and simultaneously operated so as to carry peak loads which are incurred in certain parts of the operation necessary in the drilling of a deep well. However, there are times during the carrying on of operations associated with the derrick when no single operation requires the power of all of the internal combustion engines, and there are times when one or more of the engines are furnishing power for one operation while other of the engines are furnishing power for other operations. For example, during the hoisting of the drill pipe, the power of all or nearly all of the engines may be required, but during the operation of the rotary table, the power of one or two of the engines may be directed to the driving of the rotary table while another of the engines operates the mud pumping equipment, and at this time one of the engines may be employed in mud mixing operations. It is an object of the invention to provide a simple means, operated by fluid pressure—such, for example, as compressed air—for facilitating the control of engines under various conditions of operation referred to in the foregoing.

In the early years of well drilling, steam engines were the commonly accepted source of power for the operation of the well drilling equipment. Internal combustion engine power units which are now rapidly replacing steam driven equipment, although being advantageous from the standpoint of economy for the reason that heavy boiler equipment is eliminated, have been subject to criticism because of the lack of flexibility and ease of control which was characteristic of the steam engine driven equipment. It is an object of the present invention to provide a fluid pressure actuated control having simple control elements, such as valves, situated in the driller's position of the rotary drawworks, whereby the driller may with facility control the operation of the internal combustion engine as to speed and/or power delivery as may be required by the work being done in the derrick.

A further object of the invention is to provide a control of the character set forth in the preceding paragraph which may be readily operated by foot pressure, thereby leaving the driller's hands free for the operation of the drawworks brakes and clutch control levers.

It is an object of the invention to provide a pressure actuated control for a plurality of engines, wherein control ducts are extended from the control position—for example, the driller's position of the drawworks—to the location of the engines, there being means for applying graduated pressure to these control lines operated by a person in the control position, and means at the far ends of the control ducts for translating the gradations of fluid pressure in the control ducts into proportional movements of the controls of the engines, thereby making it possible to advance or retard the controls of the engines in unison as different speeds and/or power deliveries are required.

A further object of the invention is to provide a fluid pressure actuated control for a power unit consisting of a plurality of internal combustion engines, the control being adjustable so that the well driller may have foot control over the operation of all of the engines, or a selected part of the engines, while a separate control is exercised over one or more of the engines in the performance of operations other than those over which the driller is exercising direct control.

Another object of the invention is to provide a fluid pressure operated control for a group of engines having a foot operated control valve whereby the driller may increase or diminish the power output of the engines within a range of operation, and having a separate manually operated control valve whereby the minimum speed and/or power output of the engines may be regulated.

A further object of the invention is to provide a fluid pressure operated control for a group of engines such as referred to in the foregoing whereby the driller may execute an emergency stop of all of the engines which are in operation.

Further objects and advantages of the invention will be brought out in the following part of the specification.

For the purpose of simplifying this disclosure, I have in the accompanying drawing shown the same schematically. Those acquainted with the well drilling art will understand that the driller's position 10 is situated at the front right hand corner of the drawworks of the derrick where he has full view of the well drilling operations being conducted within the derrick and may operate the various controls associated with the drawworks, these controls including the drawworks brake and the clutch shifting controls, etc. For the operation of the drawworks and other equipment, a power unit 11 is provided which is situated outside the derrick, this power unit 11 consisting of a number of internal combustion engines 1, 2, 3, etc., which have driving connection through a transmission, not shown for the reason that the transmission is not a part of the present invention, with the drawworks and other equipment.

During operations, it may be necessary to employ all of the engines simultaneously. At another time, the first engine 1 may be used alone or in conjunction with engine 2 to drive the rotary table, while the third engine 3 operates the mud pump. Under still another condition, engine 1 may drive the rotary table of the well drilling equipment, while engine 2 drives one mud pump and engine 3 drives another mud pump which may be used for mud mixing purposes or in series with the first mud pump where heavy mud pressure is required in the well drilling operation.

Each of the engines 1, 2, and 3 has a control or governor 12 for its operation, this control having a movable part, such as a lever 13, which is moved forward—for example, upwardly—to advance the control 12. With each engine, and its control, I associate an actuator 14 which, as disclosed in the actuator 14 shown with engine 1, has a fluid pressure operated part 15, shown as a diaphragm, which is connected through a stem 16 with a lever 17, this lever 17 being connected through a link 18 with the lever 13 of the control 12. The actuator 14 has a spring 19 acting downwardly against the diaphragm 15, so that the upward movement of the lever 17 will be proportionate to the increase in fluid pressure applied to the lower face of the diaphragm 15, and so that the position of the lever 17 at any time will be representative of the pressure existing against the lower face of the diaphragm 15. From each of the fluid pressure operated devices 14 a fluid pressure delivery conduit 20, 21 or 22 is extended from the power unit 11 to the driller's position of the drawworks, as shown.

In the driller's position of the drawworks 10, a pressure regulating valve 23 is installed, this pressure regulating valve having its inlet connected to piping 24 which receives air under pressure from a source of air pressure, such as a reservoir or accumulator, not shown. The outlet of the pressure regulating valve 23 is connected by a nipple 25 with the rightward end 26 of a shuttle valve 27. The pressure regulating valve 23 is of the well known type having a lever for its operation and having an exhaust part 28 which is connected to the pressure outlet of the valve when the lever is in off position. Near the floor level of the driller's position a foot operated pressure regulating valve 29 is situated, this pressure regulating valve 29 having its inlet connected to the air pressure supply piping 24 and having its outlet connected through a pipe 30 with the left hand end of the shuttle valve 27. The foot operated pressure regulating valve 29 has a member 31 adapted to be pressed downward by the driller's foot, the amount of pressure exerted through the member 31 determining the pressure to be built up in the pipe 30 and the valve outlet duct 32 which leads from the center port of the valve 27. When the pedal lever 31 of the valve 29 is fully raised, or in off position, the exhaust 33 of the valve 29 will be connected with the pipe 30.

The valve outlet duct 32, given this name for purpose of identification, extends across the position of three-way valves 34, 35, and 36. In spaced relation to the duct 32 there is a second valve outlet duct 38 adapted to receive fluid pressure from the piping 24 through a pressure regulating valve 39 which is of the same type as the pressure regulating valve 23.

The three-way valves 34 are of the well-known type diagrammatically indicated in the drawing. The end port of each of these three-way valves 34, 35, 36 are connected respectively to the first and second valve outlet ducts 32 and 38. The middle port of the three-way valve 34 is connected to the delivery duct 20 leading to the actuator 14 associated with engine 1, the middle duct of the three-way valve 35 is connected to the delivery duct leading to the actuator 14 of engine 2, and the middle port of the three-way valve 36 is connected to delivery duct 22 leading to the actuator 14 associated with engine 3. When the valves 34, 35, and 36 are all set as shown in the drawing, fluid pressure, under control of valves 23 and 29, may be delivered through the first valve outlet duct 32 to all of the actuators 14 whereby the engines 1, 2, and 3 will be controlled in unison. The three-way valves 34—36 may be selectively operated so as to disconnect any one of the delivery ducts 20, 21, or 22 from the duct 32 and to connect the same to the second valve outlet duct 38.

The delivery ducts 21 and 22 have therein respectively three-way valves 40 and 41, which are normally set "in line" with the passages through the delivery ducts 21 and 22, but which may be actuated so as to cut into either or both of the ducts 21 and 22 a fluid pressure pipe 42 adapted to receive fluid under pressure through a hand operated pressure regulating valve 43 of the same type as the valves 23 and 39, the inlet of this valve 43 being connected through a pipe 44 with a source of air pressure.

Each of the engines 1, 2, and 3 has an emergency stop 15 which may consist of a valve situated in the fuel line of the engine. To actuate the stops 15 so as to stop all of the engines, pressure cylinders 46 are disposed with their pistons 47 connected to the levers 48 of the stop devices. A valve 50 convenient to the driller's position of the drawworks 10 connects the air pressure piping 24 to piping 51 which connects with all of the cylinders 46. By opening the valve 50, the driller may apply air pressure to the cylinders 46 and actuate all of the emergency stop mechanisms 45, thereby stopping the engines.

Each of the delivery ducts 20, 21, and 22 has therein a shut off valve 55, referred to as a stop and waste valve. The valve 55 is normally adjusted so that it will be "in line" with the passage of the duct in which it is situated. When, for any reason, it is necessary to take an engine out of service, for example, to make repairs on the same, the shut off valve 55 associated therewith may be operated to cut off the portion of the delivery duct leading to the driller's position of the drawworks, and to connect the portion of the delivery duct leading to the associated actuator 14 to a bleed port which communicates with the atmosphere.

The pressure regulating valves 23 and 29, in association with the shuttle valve 27, constitute a primary control valve means whereby, through the operation of the valve 23, a predetermined minimum air pressure may be maintained in the first valve outlet duct 32 and the delivery ducts which are connected thereto through the three-way valves 34, 35, and 36, and whereby this pressure in the valve outlet duct 32, and associated ducts, may be increased at the will of the driller above the minimum value determined by the valve 23, by operation of the foot actuated pressure regulating valve 29. Therefore, the primary control valve means may be set so that the selected engines of the group of engines 1, 2, and 3 will have a minimum speed of operation, the pressure regulating valve 29, which forms a part of the primary control valve means, being operable at any time to increase the air pressure delivered to the actuators 14 associated with the designated engines, to increase the speed and/or power delivery of such engines.

If operating conditions require the use of an engine, for example, engine 3, for a separate purpose under individual control, the three-way valve 36 may be actuated so as to cut off the delivery duct 22 from connection with the duct 32 and to connect the delivery 22 to the second valve outlet duct 38. The operation of the engines 1 and 2 may be then controlled by the valves 23 and 29, and the operation of the engine 3 may be controlled by the pressure regulating valve 39. Under other conditions of operation, it may be necessary to actuate the three-way valve 35 so as to connect the actuator 14 associated with engine 2 with the second valve outlet duct 38, so that engine 2 will be controllable by the pressure regulator 39; whereas, engine 3 is independently controlled through the regulator 43 which may be disposed in a position outside the drawworks. It will be understood that when the engine 3 is to be controlled through use of the regulator 43, the three-way valve 41 will be actuated so as to connect the piping 42 to that portion of the duct 22 leading to the regulator 14 associated with the engine 3, and cutting off that portion of the duct 22 which leads to the three-way valve 36.

The shuttle valve 27 comprises an elongated casing 60 with a valve closure element, such as a ball 61, movable by fluid pressure from one end to the other of the casing 60. It will be noted that the ends of the casing 60 are connected respectively to the nipple 25 and the pipe 30, and that the middle of the casing 60 is connected to the duct 32. If the pressure regulating valve 29 is in off position so that the pipe 30 is connected to the exhaust 33, the opening of the pressure regulator 23 will introduce air through the nipple 25 into the casing 60, moving the closure 61 leftward to close the end of the casing 60 which communicates with the pipe 30 and exposing the inlet of the duct 32, whereby the air delivered from the regulator 23 through the nipple 25 into the rightward end of the casing 60 will pass into the duct 32. Should the regulator 23 be in off position, the nipple 25 will be connected to the exhaust 28, and actuation of the regulator 29 will produce a delivery of air through the pipe 30 into the leftward end of the casing 60, the air entering the casing 60 then moving the closure 61 to the rightward end of the casing, cutting off communication with the nipple 25 and producing communication between the pipe 30 and the duct 32.

I claim as my invention:

1. In a fluid actuated means for controlling a plurality of engines, arranged to be used in selected combinations or independently, from the driller's position of a drawworks, each of said engines having a control operated by a movable part, the combination of: fluid pressure operated means connected to said control parts of said engines, so as to move the same in proportion to the fluid pressure applied to said operated means; delivery ducts leading from said fluid pressure operated means to said driller's position; a valve outlet duct; a shuttle valve at the inlet of said outlet duct; primary control valve means consisting of a first pressure regulating valve disposed in said driller's position and connecting a source of fluid pressure through one side of said shuttle valve with said valve outlet duct, and a hand operated pressure regulating valve in said driller's position to connect a source of fluid pressure through the opposite side of said shuttle valve with said valve outlet duct, said hand operated valve being operable to maintain a minimum pressure in said valve outlet duct; a second valve outlet duct; secondary control valve means consisting of a pressure regulating valve in said driller's position for connecting a source of fluid pressure to said second valve outlet duct; valve means in said driller's position for selectively connecting said delivery ducts with either of said valve outlet ducts, whereby the controls of said engines may be operated selectively by said primary or said secondary control valve means; shut off valve means in each of said delivery ducts for obstructing the flow of fluid pressure through the same to said fluid pressure operated means and for connecting said fluid pressure operated means to atmosphere; a pressure operated emergency stop means for each of said engines; conduits extending from said stop means to said driller's position; and valve means in said driller's position for connecting said conduits with a source of fluid pressure.

2. In a fluid actuated means for controlling a plurality of engines, arranged to be used in selected combinations or independently, from the driller's position of a drawworks, each of said engines having a control operated by a movable part, the combination of: fluid pressure operated means connected to said control parts of said engines, so as to move the same in proportion to the fluid pressure applied to said operated means; delivery ducts leading from said fluid pressure operated means to said driller's position; a valve outlet duct; a shuttle valve at the inlet of said outlet duct; primary control valve means consisting of a foot operated pressure regulating valve disposed in the lower part of said driller's position and connecting a source of fluid pressure through one side of said shuttle valve with said valve outlet duct, and a hand operated pressure regulating valve in said driller's position to connect a source of fluid pressure through the opposite side of said shuttle valve with said valve outlet duct, said hand operated valve being operable to maintain a minimum pressure in said valve outlet duct; a second valve outlet duct; secondary control valve means consisting of a pressure regulating valve in said driller's position for connecting a source of fluid pressure to said second valve outlet duct; valve means in said driller's position for selectively connecting said delivery ducts with either of said valve outlet ducts, whereby the controls of said engines may be operated selectively by said primary or said secondary control valve means; and shut off valve means in each of said delivery ducts for obstructing the flow of fluid pressure through the same to said fluid pressure operated means and for connecting said fluid pressure operated means to atmosphere.

3. In a fluid actuated means for controlling a plurality of engines, arranged to be used in selected combinations or independently, from the driller's position of a drawworks, each of said engines having a control operated by a movable part, the combination of: fluid pressure operated means connected to said control parts of said engines, so as to move the same in proportion to the fluid pressure applied to said operated means; delivery ducts leading from said fluid pressure operated means to said driller's position; a valve outlet duct; a shuttle valve at the inlet of said outlet duct; primary control valve means consisting of a foot operated pressure regulating valve disposed in the lower part of said driller's position and connecting a source of fluid pressure through one side of said shuttle valve with said valve outlet duct, and a hand operated pressure regulating valve in said driller's position to connect a source of fluid pressure through the opposite side of said shuttle valve with said valve outlet duct, said hand operated valve being operable to maintain a minimum pressure in said valve outlet duct; a second valve outlet duct; secondary control valve means consisting of a pressure regulating valve in said driller's position for connecting a source of fluid pressure to said second valve outlet duct; valve means in said driller's position for selectively connecting said delivery ducts with either of said valve outlet ducts, whereby the controls of said engines may be operated selectively by said primary or said secondary control valve means; a pressure operated emergency stop means for each of said engines; conduits extending from said stop means to said driller's position; and valve means in said driller's position for connecting said conduits with a source of fluid pressure.

4. In a fluid actuated means for controlling a plurality of engines, arranged to be used in selected combinations or independently, from the driller's position of a drawworks, each of said engines having a control operated by a movable part, the combination of: fluid pressure operated means connected to said control parts of said engines, so as to move the same in proportion to the fluid pressure applied to said operated means; delivery ducts leading from said fluid pressure operated means to said driller's position; a valve outlet duct; a shuttle valve at the inlet of said outlet duct; primary control valve means consisting of a foot operated pressure regulating valve disposed in the lower part of said driller's position and connecting a source of fluid pressure through one side of said shuttle valve with said valve outlet duct, and a hand operated pressure regulating valve in said driller's position to connect a source of fluid pressure through the opposite side of said shuttle valve with said valve outlet duct, said hand operated valve being operable to maintain a minimum pressure in said valve outlet duct; a second valve outlet duct; secondary control valve means consisting of a pressure regulating valve in said driller's position for connecting a source of fluid pressure to said second valve outlet duct; and valve means in said driller's position for selectively connecting said delivery ducts with either of said valve outlet ducts, whereby the controls of said engines may be operated selectively by said primary or said secondary control valve means.

5. In a fluid actuated means for controlling a plurality of engines, arranged to be used in selected combinations or independently, from the driller's position of a drawworks, each of said engines having a control operated by a movable part, the combination of: fluid pressure operated means connected to said control parts of said engines, so as to move the same in proportion to the fluid pressure applied to said actuated means; delivery ducts leading from said fluid pressure operated means to said driller's position; a valve outlet duct; primary control valve means in said driller's position comprising pressure regulating valve means connecting a source of fluid pressure with said valve outlet duct, for holding a prescribed minimum pressure in said valve outlet duct and selectively increasing the pressure in said duct above said minimum; a second valve outlet duct; secondary control valve means consisting of a pressure regulating valve in said driller's position for connecting a source of fluid pressure in said second valve outlet duct; valve means in said driller's position for selectively connecting said delivery ducts with either of said valve outlet ducts, whereby the controls of said engines may be operated selectively by said primary or said secondary control valve means; a pressure operated emergency stop means for each of said engines; conduits extending from said stop means to said driller's position; and valve means in said driller's position for connecting said conduits with a source of fluid pressure.

6. In a fluid actuated means for controlling a plurality of engines, arranged to be used in selected combinations or independently, from the driller's position of a drawworks, each of said engines having a control operated by a movable part, the combination of: fluid pressure operated means connected to said control parts of said engines, so as to move the same in proportion to the fluid pressure applied to said actuated means; delivery ducts leading from said fluid pressure operated means to said driller's position; a valve outlet duct; a shuttle valve at the inlet of said outlet duct; primary control valve means consisting of a foot operated pressure regulating valve disposed in the lower part of said driller's position and connecting a source of fluid pressure through one side of said shuttle valve with said valve outlet duct, and a hand operated pressure regulating valve in said driller's position to connect a source of fluid pressure through the opposite side of said shuttle valve with said valve outlet duct; a second valve outlet duct; secondary control valve means consisting of a pressure regulating valve in said driller's position for connecting a source of fluid pressure in said second valve outlet duct; and three-way valves in said driller's position having their end ports connected to said first and second valve outlet ducts and their middle ports connected to said delivery ducts for selectively connecting said delivery ducts with either of said valve outlet ducts, whereby the controls of said engines may be operated selectively by said primary and/or said secondary control valve means.

7. In a fluid actuated means for controlling a plurality of engines, arranged to be used in selected combinations or independently, each of said engines having a control operated by a movable part, the combination of: fluid pressure operated means connected to said control parts of said engines, so as to move the same in proportion to the fluid pressure applied to said actuated means; delivery ducts leading from said fluid pressure operated means; a valve outlet duct; a shuttle valve at the inlet of said outlet duct; primary control valve means at a control station consisting of a main pressure regulating valve connecting a source of fluid pressure through one side of said shuttle valve with said valve outlet duct, and a hand operated pressure regulating valve to connect a source of fluid pressure through the opposite side of said shuttle valve with said valve outlet duct, said hand operated valve being operable to maintain a minimum pressure in said valve outlet duct; a second valve outlet duct; secondary control valve means at said control station consisting of a pressure regulating valve for connecting a source of fluid pressure to said second valve outlet duct; and three-way valves, operable at said control station having their end ports connected to said first and second valve outlet ducts and their middle ports connected to said delivery ducts for selectively connecting said delivery ducts with either of said valve outlet ducts, whereby the controls of said engines may be operated selectively by said primary or said secondary control valve means.

8. In a fluid actuated means for controlling a plurality of engines, arranged to be used in selected combinations or independently, each of said engines having a control operated by a movable part, the combination of: fluid pressure operated means connected to said control parts of said engines, so as to move the same in proportion to the fluid pressure applied to said actuated means; delivery ducts leading from said fluid pressure operated means; a valve outlet duct; a shuttle valve at the inlet of said outlet duct; primary control valve means, at a control station, consisting of a main pressure regulating valve connecting a source of fluid pressure through one side of said shuttle valve with said valve outlet duct, and a hand operated pressure regulating valve to connect a source of fluid pressure through the opposite side of said shuttle valve with said valve outlet duct, said hand operated valve being operable to maintain a minimum pressure in said valve outlet duct; and means for connecting said valve outlet duct to said delivery ducts so that the pressures in said valve outlet duct, determined by the cooperative operation of said main and hand operated valves, will be transmitted to said engines.

9. In a fluid actuated means for controlling a plurality of engines, arranged to be used in selected combinations or independently, each of said engines having a control operated by a movable part, the combination of: fluid pressure operated means connected to said control parts of said engines, so as to move the same in proportion to the fluid pressure applied to said actuated means; delivery ducts leading from said fluid pressure operated means; a valve outlet duct; a shuttle valve at the inlet of said outlet duct; primary control means, at a control station, consisting of a main pressure regulating valve connecting a source of fluid pressure through one side of said shuttle valve with said valve outlet duct, and a hand operated pressure regulating valve to connect a source of fluid pressure through the opposite side of said shuttle valve with said valve outlet duct, said hand operated valve being operable to maintain a minimum pressure in said valve outlet duct; means for connecting said valve outlet duct to said delivery ducts so that the pressures in said valve outlet duct, determined by the cooperative operation of said main and hand operated valves, will be transmitted to said engines; a pressure operated emergency stop means for each of said engines; conduits extending from said stop means to said driller's position; and valve means in said driller's position for connecting said conduits with a source of fluid pressure.

10. In a fluid actuated means for controlling a plurality of engines, arranged to be used in selected combinations or independently, from the driller's position of a drawworks, each of said engines having a control operated by a movable part, the combination of: fluid pressure operated means connected to said control parts of said engines, so as to move the same in proportion to the fluid pressure applied to said actuated means; delivery ducts leading from said fluid pressure operated means to said driller's position; a valve outlet duct; a shuttle valve at the inlet of said outlet duct; control valve means consisting of a first pressure regulating valve disposed in said driller's position and connecting a source of fluid pressure through one side of said shuttle valve with said valve outlet duct; and a second pressure regulating valve in said driller's position to connect a source of fluid pressure through the opposite side of said shuttle valve with said valve outlet duct.

LEROY NEWCOMB.

REFERENCES CITED

The following references are of record in the file of this patent:

UNITED STATES PATENTS

| Number | Name | Date |
| --- | --- | --- |
| 2,103,274 | Sanford | Dec. 28, 1937 |
| 2,240,166 | Stanley | Apr. 29, 1941 |
| 2,275,255 | Freeman | Mar. 3, 1942 |
| 2,282,194 | Lamond | May 5, 1942 |
| 2,404,545 | Stevens | July 23, 1946 |